Oct. 21, 1947.  J. G. JERGENS  2,429,516
PILOT BEARING
Filed May 20, 1946

INVENTOR.
John G. Jergens
BY
Evans + McCoy
ATTORNEYS

Patented Oct. 21, 1947

2,429,516

UNITED STATES PATENT OFFICE 2,429,516

PILOT BEARING

John G. Jergens, Shaker Heights, Ohio

Application May 20, 1946, Serial No. 670,859

4 Claims. (Cl. 308—187.1)

This invention relates to pilot bushings adapted to provide a bearing between elements having relatively rotary and axial movements, such as for example between rotating and non-rotating spindles of a lathe, or between a fixture and an axially movable shaft such as a drill spindle.

Objects of the invention are to provide a pilot bushing which is of simple construction and easy to assemble; to provide a pilot bushing that is easy to adjust to compensate for wear; to provide a pilot bushing capable of resisting heavy axial and radial thrusts, and to provide a bushing having improved lubricant retaining means.

It is also an object of the invention to provide a bushing that is so constructed that it can be readily mounted in a cylindrical bore formed in a spindle or fixture and which can be quickly and easily replaced with a bushing of a different internal diameter.

With the above and other objects in view, the invention may be said to comprise the pilot bushing as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
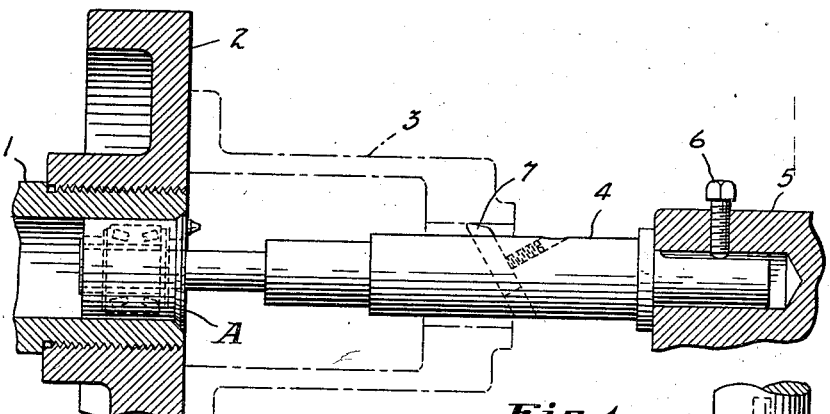
Figure 1 is a sectional view showing a pilot bushing of the present invention mounted in the rotary spindle of a lathe and rotatable and slidable on a stationary spindle.

Referring to Fig. 1 of the drawing, a pilot bushing A is mounted in an end of a tubular lathe spindle 1 which carries a work supporting holder or chuck 2. As herein illustrated, the holder 2 supports a hollow work piece 3 through which a stationary spindle 4 extends. The spindle 4 has one end slidably mounted in the bushing A and its opposite end rigidly secured to a tailstock 5 by suitable means such as a screw 6. The spindle 1 moves axially as it rotates and the spindle 4 has a cutting tool 7 mounted therein which engages the interior of the work piece 3 as the work piece is rotated and advanced axially.

Figure 3:
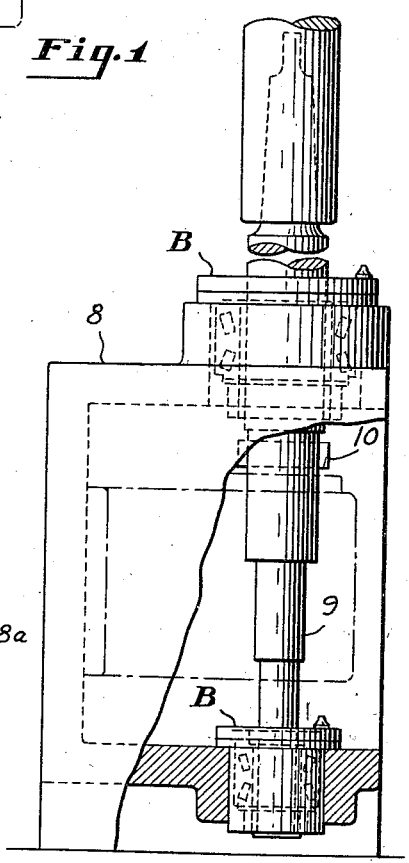
Fig. 3 is a sectional view showing a pair of pilot bushings embodying the invention mounted in a work holding fixture to guide a vertically movable drill spindle.

In Fig. 3 of the drawing two pilot bushings B are shown mounted in a work holding fixture 8, the bushings B being axially alined and superposed one above the other. The bushings B provide bearings for a vertically movable rotating drill spindle 9 which carries a boring or reaming tool 10 for engagement interiorly of a work piece mounted in the fixture 8.

Figure 2:
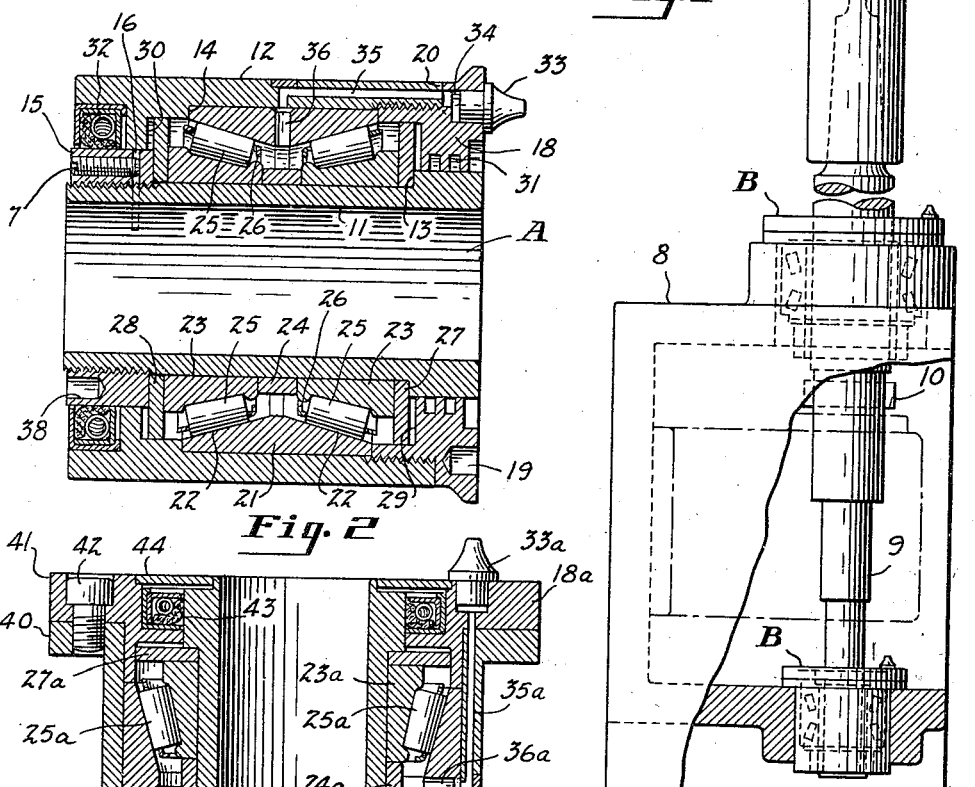
Fig. 2 is an axial section through the pilot bushing shown in Fig. 1.

Referring to Fig. 2 of the drawing, the bushing A comprises an inner sleeve 11 and an outer sleeve 12. The two sleeves are coaxial and the outer sleeve is of greater diameter and spaced radially from the inner sleeve to provide an annular bearing receiving chamber between the sleeves. The sleeve 11 has an external shoulder 13 adjacent one end and the sleeve 12 has an internal shoulder 14 adjacent one of its ends. The two sleeves are assembled with the shoulders 13 and 14 oppositely disposed to position bearing races mounted on the two sleeves. The inner sleeve 11 is externally threaded at one end and receives a closure member 15 which is in the form of a collar screwed upon the sleeve 11. The collar 15 is partially split by means of a circumferential slot 16 and is adapted to be locked in adjusted positions by means of a spreading screw 17 that is threaded in an opening that extends from the outer edge of the collar to the slot 16 substantially midway between the ends of the slot to spread apart the portions of the collar separated by the slot and frictionally lock the threads of the collar and sleeve. The external sleeve 12 is internally threaded at the end opposite that provided with the shoulder 14 and an annular closure member 18 is screwed into the sleeve 12. The closure member 18 is provided with spanner sockets 19 and has a shoulder 20 that engages the end of the sleeve 12. A bearing cup 21 is slidably mounted within the sleeve 12 and is clamped between the shoulder 14 and the inner end of the closure member 18. The bearing cup 21 has oppositely tapering cone surfaces 22 and a pair of cone rings 23 are mounted on the inner sleeve 11, one within each of the cone surfaces 22 of the cup. A spacer 24 is interposed between the cone rings 23 and cone rollers 25 mounted in suitable cages 26 are interposed between the cone rings 23 and the conical surfaces 22 of the cup. The cone rings 23 and spacer 24 are clamped between the shoulder 13 of the inner sleeve 11 and the adjustable collar 15. The bearing can be readily adjusted to take up wear on the cup or cone rings by removing the bearing, grinding the spacer 24 to make it narrower, reassembling the bearing and tightly clamping the cone rings by adjusting the collar 15.

A lubricant retaining disc 27 is clamped between the shoulder 13 of the inner sleeve and the adjacent cone ring and a second lubricant retaining disc 28 is clamped between the collar 15 and the adjacent cone ring. The retaining discs 27 and 28 fit upon the exterior of the sleeve 11, the disc 27 having small clearance within the closure member 18 attached to the outer sleeve 12 and the disc 28 having small clearance within the interior of the sleeve 12 at the opposite end of the bushing.

The closure member 18 has an inner face 29 that is closely adjacent the disc 27 and the sleeve 12 has an integrally projecting flange 30 that closely overlies the outer face of the disc 28. Because of the small clearance between the discs 27 and 28 and the relatively rotatable outer sleeve, the leakage of lubricant past the outer peripheries of the disc is greatly retarded and the narrow annular chambers exteriorly of the discs further retard the escape of lubricant since centrifugal force tends to hold the lubricant in the narrow annular spaces between the closure member 18 and flange 30 and the outer faces of the discs. Additional sealing means is preferably provided exteriorly of the retaining discs 27 and 28. As shown in Fig. 2, the closure member 18 is provided with a labyrinth seal 31 and a sealing ring 32 is mounted in the sleeve 12 and engages with the periphery of the collar 15.

A lubricant fitting 33 is attached in a socket 34 formed in the closure member 18 which communicates with a passage 35 formed in the sleeve 12 and extending to a central point where it communicates with a radial passage 36 through the bearing cup 21. Lubricant may be introduced through the fitting 33 into the bearing chamber and lubricant so introduced may substantially fill the space between the retaining discs 27 and 28.

In assembling the bearing the disc 27 is slipped over the small end of the inner sleeve 11 and positioned against the shoulder 13 after which the cone ring 23 that tapers toward the small end of the sleeve 11 with its rollers 25 in place, is positioned against the inner face of the ring 27. The spacer ring 24 is then placed against the inner edge of the cone ring and the bearing cup is positioned in engagement with the rollers 25 on the previously positioned cone ring. The second cone ring with its rollers is then put in place within the bearing cup and the second disc 28 is placed in engagement with the outer edges of the cone ring. The bearing members are then clamped in place by means of the threaded collar 15 which is exteriorly cylindrical and which may be provided with suitable wrench receiving sockets 38 in its outer end. The outer sleeve 12 with the sealing ring 32 mounted therein is then slipped in place over the bearing cup 21 until its shoulder 14 engages the cup and the flange 30 and sealing ring 32 closely overlie the cylindrical periphery of the collar 15 which with the the flange 30 and ring 32 close an end of the lubricant retaining bearing chamber. The closure member 18 is then screwed into the threaded end of the outer sleeve 12 to close the opposite end of the bearing chamber.

Figure 4:
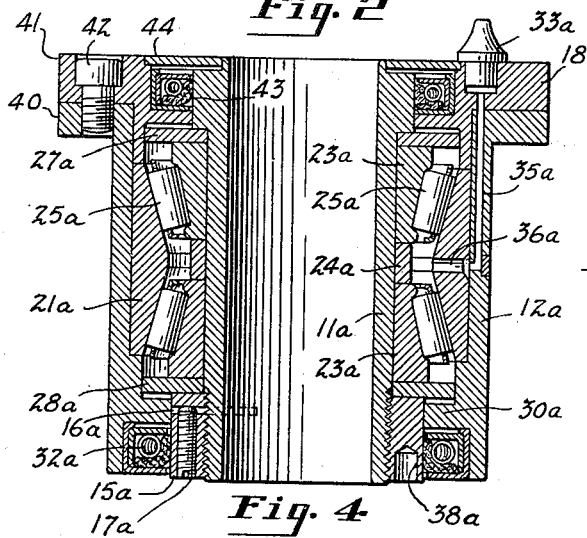
Fig. 4 is an axial section through the pilot bushing shown in Fig. 3.

In Fig. 4 of the drawings the pilot bushing B is illustrated. This bushing is in most respects identical with the bushing shown in Fig. 2 and corresponding parts are designated by the same reference numerals with the addition of the letter a. In this modification the outer sleeve 12a is provided at one end with a peripheral outwardly projecting flange 40 and a closure member 18a is provided with a flange 41 that fits against the flange 40 and which is attached to the flange 40 by means of bolts 42. In this modification the closure member 18a is provided with a seal in the form of a packing ring 43 that is held in place by means of an angle shaped retaining ring 44 which has a flat flange forming an inner wall of the closure member corresponding to the inner wall 29 of the closure member 18 in the modification first described. Otherwise the bushing shown in Fig. 4 is substantially identical with that shown in Fig. 2.

It is to be understood that variations and modifications of the specific devices herein shown and described for purposes of illustration, may be made without departing from the spirit of the invention.

What I claim is:

1. A pilot bearing comprising two relatively rotatable concentric sleeves forming an annular chamber between them, the outer sleeve having an internal shoulder and the internal sleeve having an external shoulder, said shoulders being adjacent opposite ends of the chamber, an end closure member attached to the end of the outer sleeve opposite that having the internal shoulder, an end closure member attached to the opposite end of the inner sleeve, a double cone cup clamped between the shoulder and closure member of the outer sleeve, two cone rings and an intermediate spacer clamped between the shoulder and closure member of the inner sleeve, bearing rollers interposed between the cone rings and cup, and oil seals interposed between each closure member and the sleeve which rotates relative to the closure member.

2. A pilot bearing comprising two relatively rotatable concentric sleeves forming an annular chamber between them, the outer sleeve having an internal shoulder and the internal sleeve having an external shoulder, said shoulders being adjacent opposite ends of the chamber, a double cone bearing cup fitting within the outer sleeve, means carried by the outer sleeve for clamping said cup to said internal shoulder, two cone rings and an intermediate spacer slidably fitting on the inner sleeve, rollers interposed between said cone rings and cup, a collar screwed upon the inner sleeve, a lubricant retaining disc clamped between one of said cone rings and said external shoulder, a second lubricant retaining ring clamped between the other cone ring and said collar, and oil seals at the ends of the annular chamber outwardly of said lubricant retaining discs.

3. A pilot bearing comprising two relatively rotatable concentric sleeves forming an annular chamber between them, the outer sleeve having an internal shoulder and the internal sleeve having an external shoulder, said shoulders being adjacent opposite ends of the chamber, a double cone bearing cup fitting within the outer sleeve, means carried by the outer sleeve for clamping said cup to said internal shoulder, two cone rings and an intermediate spacer slidably fitting on the inner sleeve, rollers interposed between said cone rings and cup, a collar screwed upon the inner sleeve, a lubricant retaining disc clamped between one of said cone rings and said external shoulder, a second lubricant retaining ring clamped between the other cone ring and said collar, said retaining discs having their peripheries closely adjacent the interior of the outer sleeve, and inwardly projecting portions at the ends of said outer sleeve closely adjacent the outer faces of said discs to impede passage of lubricant.

4. A pilot bearing comprising two relatively rotatable concentric sleeves forming an annular chamber between them, the outer sleeve having an internal shoulder and the internal sleeve having an external shoulder, said shoulders being adjacent opposite ends of the chamber, a double cone bearing cup fitting within the outer sleeve and engaging said shoulder, a pair of cone rings fitting on the inner sleeve, conical bearing rollers interposed between each cone and said cup, a collar threaded on said inner sleeve at the end opposite said external shoulder, a lubricant retaining disc clamped between one of said cone rings and said collar, a second lubricant retaining disc clamped between said external shoulder and the other of said cone rings, said lubricant retaining discs having peripheries closely adjacent the interior of the outer sleeve, an inwardly projecting flange on the outer sleeve closely overlying the outer face of the disc engaged by said collar, a closure member attached to the outer sleeve, said closure member having a portion within the outer sleeve in clamping engagement with said cup and a portion closely overlying the outer face of said second lubricant retaining disc, an oil seal between said outer sleeve and collar outwardly of said inwardly projecting flange, and an oil seal between said closure member and the inner sleeve outwardly of said second lubricant retaining disc.

JOHN G. JERGENS.